United States Patent [19]
Goodman et al.

[11] Patent Number: 5,466,297

[45] Date of Patent: Nov. 14, 1995

[54] PROCESS FOR REMOVAL OF PRIMARILY IRON OXIDE DEPOSITS

[75] Inventors: Walter H. Goodman, Lisle; Narasimba M. Rao, Naperville; Donald A. Johnson, Batavia, all of Ill.

[73] Assignee: Nalco Chemical Company, Naperville, Ill.

[21] Appl. No.: 985,703

[22] Filed: Dec. 4, 1992

Related U.S. Application Data

[63] Continuation-in-part of Ser. No. 742,789, Aug. 8, 1991, abandoned.

[51] Int. Cl.$^6$ .................... C23G 1/02; C02F 1/42
[52] U.S. Cl. .................... 134/3; 134/2; 134/10; 134/41; 210/688
[58] Field of Search ............ 134/3, 2, 10, 41; 210/670, 673, 688; 252/82, 83

[56] References Cited

U.S. PATENT DOCUMENTS

| | | | |
|---|---|---|---|
| 4,190,463 | 3/1980 | Kaplan et al. | 134/3 |
| 4,222,886 | 9/1980 | Connelly, Jr. | 134/3 X |
| 4,303,704 | 12/1981 | Courduvelis et al. | 210/662 X |
| 4,623,399 | 11/1986 | Frenier | 134/3 |
| 4,664,811 | 5/1987 | Operhofer | 210/673 |
| 4,810,405 | 3/1989 | Waller et al. | 134/3 |
| 5,037,483 | 8/1991 | Dubin | 134/3 |

OTHER PUBLICATIONS

"Effect of Citric Acid Cleaning on Steel Corrosion, especially welds in AISI-304 stainless equipment, 1967-Dec. 1987", Literature Search Report No. 2396, by Steve Boyle.

"Use of Erythorbic (Isoascorbic, Araboascorbic) Acid for Removal of Iron Deposits and Iron Corrosion Products from Boilers, Pipes, and Other Ferrous Metal Surfaces" Literature Search Report No. 1163, by Carmen Nitsche Jul. 1990.

*Primary Examiner*—Jan H. Silbaugh
*Assistant Examiner*—Saeed Chaudhry
*Attorney, Agent, or Firm*—James J. Drake; Robert A. Miller

[57] ABSTRACT

A method is described for removing ferrometal corrosion products from cooling water systems, which method recycles ferrous/ferric complexing agents and leads to low volume highly concentrated iron wastes for disposal. The method combines, preferably, the use of citric acid or citric acid-tannin complexing agents with erythorbic acid reducing agents to clean corroded surfaces followed by recovery of both complexing and reducing agents for recycle by contacting spent cleaning solution with strong acid cation exchange resins or chelating resins. The resins remove and retain iron species, releasing chelating and reducing agents to resin bed effluents. These are recycled. A concentrated iron waste stream is recovered by regenerating the resin beds with strong acids, preferably HCL, $H_2SO_4$, and the like.

8 Claims, 4 Drawing Sheets

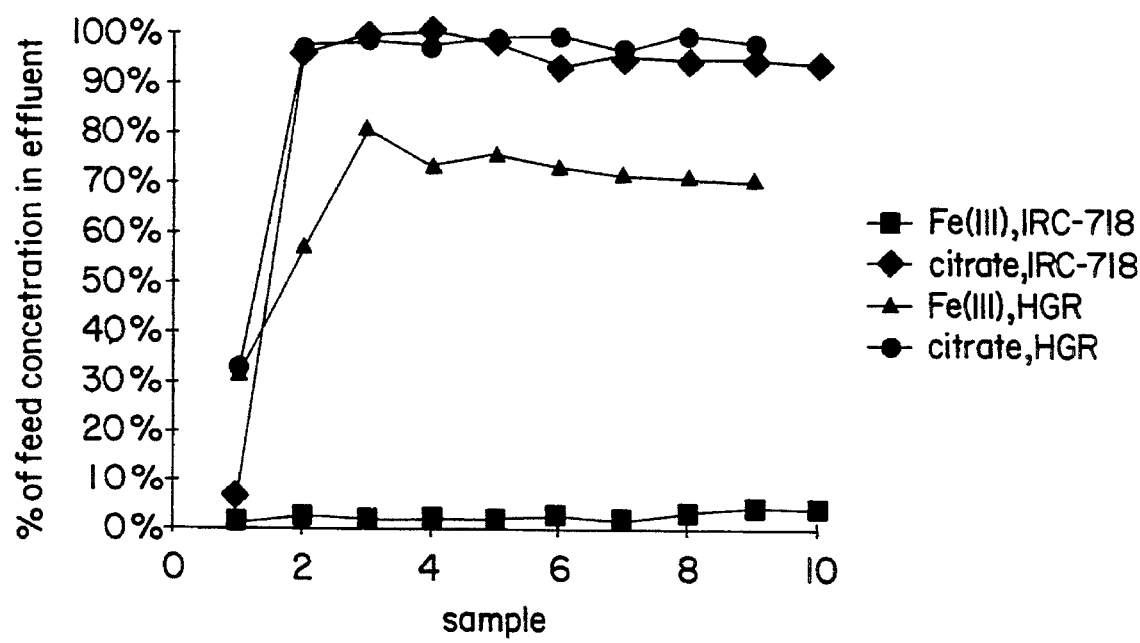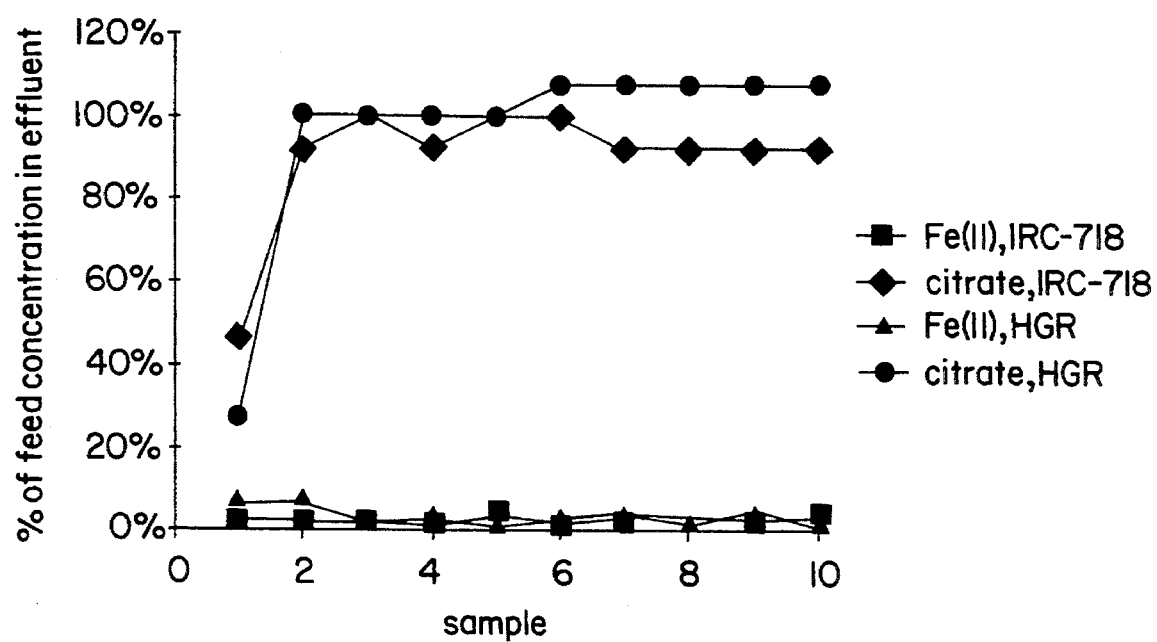

PROCESS FOR REMOVAL OF PRIMARILY IRON OXIDE DEPOSITS

BACKGROUND OF THE INVENTION

1. Reference to Related Patent

The present application is a continuation-in-part of application Ser. No. 07/742,789 filed Aug. 8, 1991 now abandoned by Walter H. Goodman, et. al., entitled "Process For Removal of Primarily Iron Oxide Deposits," the disclosure of which is incorporated herein by reference.

2. Field of the Invention

The invention relates to removing oxide deposits and, more particularly to a method for removing chemical corrosion products from cooling water systems.

3. Description of the Prior Art

Most industrial heat exchangers are composed of bundles of ferro-metal tubes through which heat transfer and exchange liquids, i.e. cooling waters, are pumped on the cooling side and process liquids or vapors are passed on the process side for the purpose of cooling these process streams. Most of these systems designed for the purpose of cooling process vapors or liquors are constructed of metallic materials, particularly ferrometals, such as iron or steel. However, occasionally nonferrous metals are used, particularly the admiralty metals and sometimes such exotic metals as titanium and the like.

When these heat exchange systems involve heat transfer to a circulating cooling water where the heat is removed atmospherically by passing these waters through cooling towers, the primary material of construction are ferrometals, such as carbon steels, stainless steels, iron, and various iron or steel alloys. These constructions are herein referred to as ferrometals and the systems using these ferrometals to cool or for that matter to heat process liquids and vapors are referred to herein as ferrometal systems.

These ferrometal systems when in use, can rapidly form iron oxides, iron hydroxides, and other corrosion products, particularly when exposed to cooling waters or exposed to corrosive process vapors or liquids. When these iron corrosion products, particularly the iron oxides and iron hydroxides, are formed, they normally form on the surface of the ferrometals and their presence greatly inhibits heat transfer thereby decreasing the efficiency of the system for its design use. If the heat transfer surface is manufactured of iron, steel, or various iron alloys, the iron oxides or other iron corrosion products are easily formed. Even if the heat transfer surface itself is not of iron, or an iron or steel alloy, if that system itself is exposed to iron or iron soluble species, these same iron deposits can form on the heat transfer surface by means of precipitation. The formation of these deposits whether the deposits are formed on ferrometal surfaces, or on other metallic surfaces, such as admiralty surfaces or titanium surfaces, reduce the heat transfer efficiency, and techniques which remove these iron oxide deposits are valuable for the purpose of energy conservation.

It is common to mechanically clean these heat transfer surfaces when the iron oxides become excessive. However, mechanical cleaning is expensive, time consuming, and requires that the unit being cleaned be shut down.

Although there is technology available to attempt to clean these heat transfer surfaces of their deposited iron oxides and iron corrosion products while the system is still "on line", these "on line" systems sometimes cannot keep up with the corrosion process. Eventually the deposited iron oxides and other iron corrosion products become so extensive that a so-called "on line" cleaning is inappropriate. At this point, the unit should be shut down, and cleaned appropriately. An example of "on line" cleaning is set forth in U.S. Pat. No. 5,037,483, Dubin, which is incorporated herein by reference.

An example of "off line" cleaning is set forth in U.S. Pat. No. 4,190,463, Kaplan, which also is incorporated herein by reference. However, the procedures used in Kaplan and in other procedures for cleaning iron corrosion products often require large amounts of treating solution and create a waste disposal problem which, if unanswered, causes the ability to use these "off line" treatments to be non-economic. The cleaning formulations themselves can include relatively expensive ingredients, but the Kaplan, and like processes do not deal with recycling.

Other means of preventing and cleaning iron fouling has been used to prevent and clean the fouling of ion exchange resins. The primary example of the prevention of iron fouling of ion exchange resins includes U.S. Pat. No. 4,664,811, Oberhofer, which patent also is included herein by reference.

In each of the above patents, the iron oxides and other iron corrosion products are treated by adding a reducing agent, a complexing agent, and other ingredients to control, for example, other phenomena which may occur if the system being treated also contains admiralty metals or the pH of the treating solution becomes acidic. The use in the prior art of complexing agents and reducing agents again create often the waste problem because the system solutions coming from the system being cleaned are heavily contaminated with iron salts, iron chelates, sludges, and the like. These waste cleaning solutions are difficult to treat and/or discard under the current environmental laws.

SUMMARY OF THE INVENTION

It is an object of this invention, therefore, to develop an "off-line" method for cleaning corroded ferrometal systems, which method can provide for excellent cleanability of the corrosion product from the ferrometal surface along with a recovery of the treating solution active ingredients, such as the reducing agents and the sequestering or chelating agents, and a concentration simultaneously of waste products providing for a concentrated waste stream, which is more easily and inexpensively discarded.

Another object of this invention is to treat a corroded ferrometal system chosen from the group consisting of open cooling water systems, closed cooling systems, atomic reactor cooling water systems, and the like by adding to the system, when "off line" and inoperative, a treating formulation comprising the ingredients:

a. a water soluble iron complexing agents; from 1.0–20.0 weight percent b. a ferric ion reducing agent; from 0–5.0 weight percent c. a copper corrosion inhibitor; from 0–0.1 weight percent d. an acid corrosion inhibitor; from 0–0.2 weight percent e. water; the remainder, said treating formulation having a pH ranging from about 1.0 to about 5.0.

Then, after circulation within the ferrometal system, a portion of the system formulation is, either continuously or intermittently, taken from the system and added to appropriate exchange resins having the capability of removing metals, such as ferrous and ferric ions and permitting the reducing agents and complexing agents to pass the resin and be returned for recycle use in the ferrometal system cleanup.

BRIEF DESCRIPTION OF THE DRAWING

FIG. 1 presents the results from contacting Fe(II) and Fe(III) citrate complexes, in solution, with various metal ionic exchange resins. Citrate is not retained by the resin, whereas both Fe(II) and Fe(III) are retained.

DETAILED DESCRIPTION OF THE PREFERRED EMBODIMENT

Figure 2:
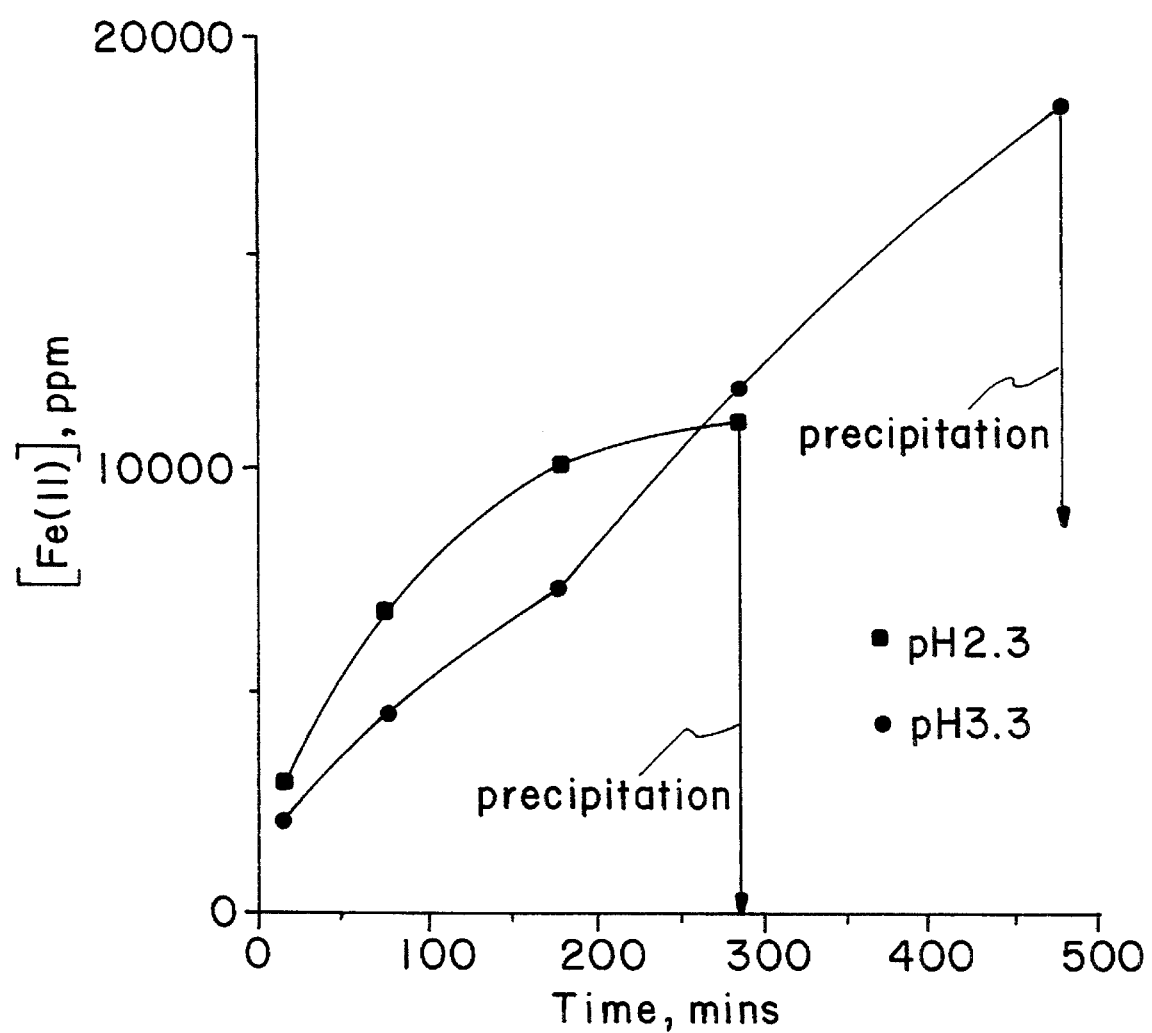
FIG. 2 demonstrates the precipitation of ferrous citrate at various operating pH.
Figure 3:
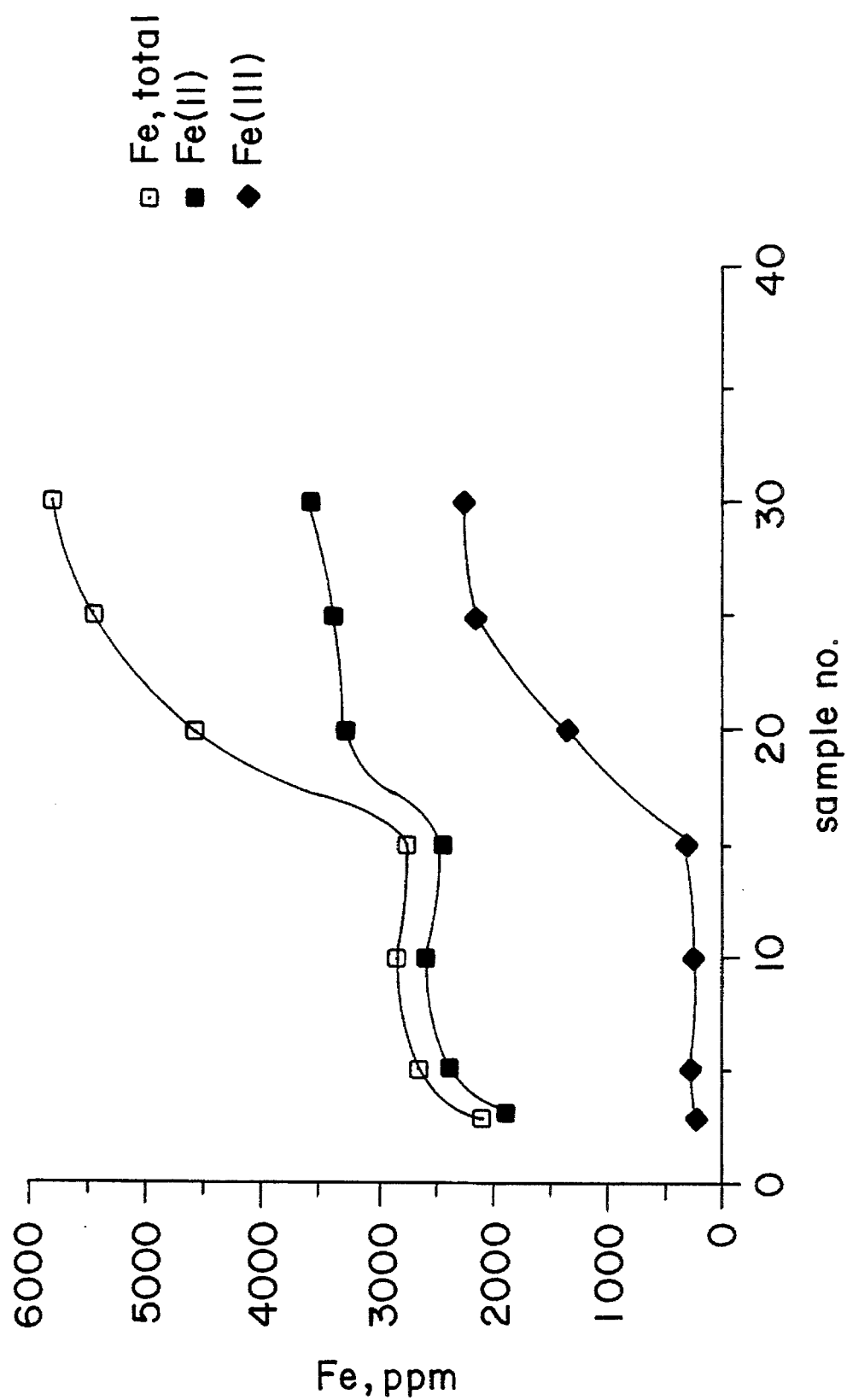
FIG. 3 present so called "titration curves" for a commercially available iminodiacetic acid "chelating" resin.

The treating formulation above is added to the corroded ferrometal system in sufficient volume to contact all of the ferrometal surfaces containing corrosion products and, when the ferrometal systems has other metallic surfaces containing deposits of iron oxides, iron hydroxides, iron carbonates, or other iron corrosion products, in sufficient volume to contact all surfaces containing corroded ferrometal corrosion products.

The ferrometal system, or any portion thereof, once containing sufficient volume of the treating formulation, is enclosed, and the treating formulation is circulated within the ferrometal system, or the chosen portion, at temperatures ranging from about 20° C. to about 90° C., preferably between about 20° C.–65° C., and most preferably between about 20° C. and 50° C. During this circulation, at said temperatures, the treating formulation is monitored and pH adjustment chemicals, such as strong acids or strong bases, are added to the system, as required, to maintain the pH of the recirculation system formulations within the range of about 1.0 to about 5.0, thereby forming a treated system formulation, which system formulation contains all of the ingredients in the treating formulation and which now contains some portion of iron salts, and other materials from the ferrometal system, which may be dissolved or dispersed therein.

The system formulation is maintained within the pH range of 1.0 to 5.0, as described above, by the addition of either strong acids, preferably sulfuric acid, or bases, if necessary, such bases including sodium hydroxide, potassium hydroxide, and the like. However, in normal operation, the corrosion products, as they dissolve, have a tendency to increase the pH of the system formulations, so if pH modification and maintenance is required, it normally is required by the addition of sulfuric acid so as to maintain the pH within the low pH range of from 1.0 to 5.0, preferably from 2.0 to 4.5, and most preferably from about 2.5 to about 4.0.

While the circulation and monitoring of the system formulation continues, the system formulation is also monitored for its content of soluble iron. This iron may occur as ferrous iron, ferric iron, ferrous complexes with any appropriate water soluble iron complexing agent chosen, ferric iron complexes with any appropriate water soluble iron complexing agent chosen, or dispersed iron precipitates or metallic iron in the system formulation being circulated. The monitoring for iron in the system formulation is primarily made for soluble iron species, which soluble iron species include a total soluble iron species including all of the iron species mentioned above, whether in the ferrous or the ferric state, or whether in the complexed or non-complexed state.

When the total ferrous iron content of the system formulation reaches the level of at least 500 parts per million, or higher, based on the system formulation, a portion of the system formulation fluid is removed continuously or intermittently and contacted with a metal ionic exchange resin, said resin having a greater affinity for ferrous and ferric ion or mixtures thereof, than does the iron complexing agent of the treating formulation.

By the term "greater affinity" we mean that the formation constant for either ferrous ion with the ionic exchange resin or ferric ion with the ionic exchange resin is greater the formation constant for ferrous ion with the water soluble iron complexing agent used in the treating formulation or ferric ion with the water soluble iron complexing agent of the treating formulation, or mixtures thereof. By having this greater affinity for ferrous and/or ferric ion, the resin chosen therefore forms an iron, be it ferrous or ferric, resin adduct, which is retained by the exchange resin and releases the water soluble iron complexing agent into the resin effluent stream exiting the container in which the resin is held.

The Exchange Resins

The metal ionic exchange resins are preferably those resins that are strong acid ion exchange resins, such as cross-linked styrene, divinyl benzene resins containing sulfonate functional groups, or they may also be so called chelating resins, such resins exemplified by cross-linked styrene, divinyl benzene resins containing iminodiacetic acid functionality. The organic resins may also be replaced by inorganic ion exchange materials, such as certain zeolites which have strong cationic exchange capacities.

The strong acid resins are exemplified, for example, by Dow Chemical Company's Dow HGR strong acid cation exchange resin. A chelating resin, which functions in the invention, is represented by the Rohm and Haas chelating resin, IRC-718. The resins may be used in the acid form, in the sodium form, and may also be used as other salt forms, such as potassium, ammonium, and the like. Preferably, the resins are used in the free acid form.

Although the above exemplified strong acid cationic exchange resins and chelating resins have been demonstrated to function in our invention, the invention is not to be limited to the use of these specific resins, but is meant to include the use of any resin, or inorganic zeolitic packings which have a formation complex with either ferrous or ferric ions, or both, that is equal to or preferably greater than the ferrous and/or ferrous ion complexing formation constant of the complexing agent used in the treating formulation.

The Water Soluble Iron Complexing Agent

When the strong cationic exchange resins above listed, or the chelating resin above listed are used in the invention, it has been found beneficial to use as the water soluble iron complexing agent, citric acid, tartaric acid, tannic acid, tannins, and the like; or hydroxyacetic acid and formic acid in weight ratios of from 2:1 to 1:2 have also been found to be useful as iron complexing agents.

These materials may be used singly or in combination with one another. Preferably, the water soluble iron complexing agent is citric acid or a water soluble titrate salt and is contained in the treating formulation in a concentration ranging from about 1 percent to about 20 weight percent, preferably from about 2 percent to about 15 weight percent, and most preferably from about 5 percent to about 10 weight percent. Although the use of the iron complexing agents listed above, either by themselves or in combination may be accomplished with no further addition of other ingredients to the treating formulation, the preferred treating formulation optionally and preferably contains a reducing agent for ferric ion and when necessary, copper corrosion inhibitors, acid corrosion inhibitors, antifoam agents, and the like.

As described above, the water soluble iron complexing agents may be chosen from any complexing agent which is capable of complexing ferric ion and ferrous ion so as to enhance the removal of these ions from the scales formed in the corroded ferrometal surfaces. These complexing agents provide for the ferrous or ferric iron complex which is soluble in the system formulation and is later treated by the resin beds described. These iron complexing agents are preferably citric acid or citric acid salts, or salts, tannic acid or tannic acid salts, tartaric acid or tartaric acid salts, and the like. The only limitation on the water soluble iron complexing agent is that it form a complex with ferrous and ferric ion, which is water soluble up to the limits of the operations, that it have a complexing constant which is lower than the complexing constant for the resin bed for either ferrous or ferric ion, or both, and that it maintains solubility and pass through the resin bed in a way that it can be recovered in the amounts indicated above.

The Ferric Ion Reducing Agent

It has been found that certain ferric complexes, in fact, can enhance corrosion when in contact with ferrometal surfaces in aqueous solution. Therefore, a high concentration of ferric ion in water or a ferric ion complex with a complexing agent in water has been demonstrated in the past to create the possibility of ferrometal surface corrosion in contact with waters containing the same. As a result, it is preferred in the practice of our invention to formulate the treating solutions or treating formulations, not only to include water soluble iron complexing agents, but also to include ferric ion reducing agents. When this combination is made, the iron contained in the system formulation is preferably controlled such that of the total iron, the ratio of ferrous to ferric ion present ranges between about 5:1 to about 1:1. The ferric ion reducing agent, which is optionally but preferably contained in the treating formulation can be chosen from any reducing agent capable of reducing ferric ion, but has further limitations and that the presence of the reducing agent cannot in itself cause corrosion, or cause precipitates to form, and it must also be able to be pass through the ion exchange resin bed and recovered essentially as described above. The preferred ferric ion reducing agent is a tannin or a erythorbic or ascorbic acid or their salts. When the ferric ion reducing agent is present in the treating formulation, it is normally present from 0 to 5 weight percent, preferably from 0.1 to 4 weight percent, and most preferably from 0.5 to 3.5 weight percent. The preferred ferric ion reducing agent is at least one of the groups, erythorbic acid, ascorbic acid, hydrazinc, carbohydrazide, and the like. Sulfites can work, but can create some difficulty. The reducing agent is preferable sulfur free.

The treating formulation may be varied on site in terms of the amount of ferric ion reducing agent present to control the presence of ferric ion in the system formulation. As described above, it is preferred that the ferric ion ratio relative to total iron be such that ferric ion is no more than about one half of the total iron present. Ferric ion and ferric ion complexes have been shown in the past to cause corrosion with ferrometal surfaces in contact with water containing the same and as a result, it is preferred that the ferric ion reducing agent be present in sufficient concentrations in the system formulation so as to provide for no more than a ratio of ferrous to ferric ion ranging between 5:1 to about 1:1. If the ferric ion concentration in the circulating system gets much higher than the 1:1 ratio with ferrous:ferric ions, the system being treated has a tendency to provide additional corrosion to the ferrometal surfaces contained therein.

Of the ferric ion reducing agents, the most preferred reducing agent is erythorbic acid, and it is preferably contained in the treating formulation within the range of 0.1–3.0 weight percent.

After the solution has been circulating within the system for a period of time, the total iron content reaches a level of at least 500, preferably 1,000–2,000 ppm, or higher. This system solution is then, either continuously or intermittently, at least partially removed from the system and a portion added to the ion exchange resins as described above. The resins may be contained in a column or in a mixing vessel, but the resins are normally contained in some container through which the system formulation containing at least 500 parts per million iron is passed so as to accomplish contact with the resin. After the contact of the resin is made, the resin is retained in the container or in the column and effluent from the container or column is collected, which effluent is referred to as a recovered treating formulation. This recovered formulation contains at least about 90 percent of each of the ingredients originally present in the original treating formulation.

Often, the recovered formulation approaches nearly 100% recovery of the original treatment formulation.

This recovered treating formulation is then recycled back to the ferrometal system and use is continued of this recovered treating formulation in the continuing cleaning steps, as described above. If iron is detected, preferably at levels exceeding about 10% of influent concentrations, in the recovered treating formulation, exiting the resin container, column, or resin bed, the exchange resins are removed from contact with the system formulation and fresh resin or regenerated resin is used to replace these so-called spent resins. This can be done either on a batch basis or more likely can be done either by operating an ion exchange columnar resin bed or multiple columnar resin beds, some of which are operating in contact with the system formulation and some of which are being regenerated with strong acids.

When the system formulation is removed from contact with the spent resins, these spent resins are regenerated by adding strong inorganic acids, such as hydrochloric acid, sulfuric acid, and the like to the resin bed for sufficient time to abstract therefrom all iron contained thereon, thereby forming a regenerated resin bed, either in the form of a strong acid resin bed or in a form of a chelating resin bed as described above, and a concentrated waste iron solutions containing high concentrations of iron and other waste cations. The waste iron solutions may be discarded, precipitated, or further treated prior to disposal to the environment. The concentrated iron streams may also arguably be concentrated further and used in those uses typical of high concentrations of iron salts, such as in the manufacture of cast iron or steels and the like.

The regenerated resins may be put back into service, on stream, as required.

The Other Ingredients

The treating formulation may contain other ingredients, such as copper corrosion inhibitors and acid corrosion inhibitors. Although there are many types of copper corrosion inhibitors, the primary type used are the triazoles, particularly tolyltriazole. When tolyltriazole is present, it is present normally between 0 to about 1,000 parts per million (or about 0.1 weight percent of the treating formulation). At these concentrations, tolyltriazole is effective in inhibiting any copper corrosion occurring on admiralty metals which may be involved in the ferrometal system being treated. The treating formulation as formulated with copper corrosion inhibitors may still effectively remove corroded ferrometal components from these systems even though these corroded ferrometal components are contained on an admiralty surface.

Similarly, since our system formulation and treating formulations are both at and/or operating within pH ranges of from 1.0 to 5.0, it is advisable, although optional, to have in the treating formulation a so-called acid corrosion inhibitor. These acid corrosion inhibitors are contained in the treating formulation optionally from between to about 0 to about 0.2 weight percent (or about 2,000 parts per million). The preferred acid corrosion inhibitors are diethylthioureas, various pyridinium salts, or mixtures thereof. The preferred acid corrosion inhibitor is a commercial product having the trade name, Rhodine R 31A. These materials are normally present in the formulation in concentrations ranging from about 25 to about 1500 parts per million and most preferably are contained in the treating formulation in concentrations ranging from about 100 to about 500 parts per million.

The treating formulations may also optionally contain surfactants, dispersants, antifoaming agents and the like.

Preferred Formulations

The preferred treating formulation normally contains citric acid, or water soluble salts thereof, in a concentration ranging from about 2.5 to 20 weight percent, most preferably from about 5 to about 10 weight percent and also contains erythorbic acid or a salt thereof in a concentration ranging from about 0.5 to about 3.0 weight percent, most preferably from about 1.0 to about 3.0 weight percent. These preferred treating formulations also contain a triazole copper corrosion inhibitor, preferably tolyltriazole at concentrations ranging from about 100 to about 500 parts per million and an acid corrosion inhibitor, preferably diethylthiourea, (Rhodine 31A) such that the diethylthiourea active ingredient is present in the formulation at from about 100–500 parts per million. The treating formulations may optionally contain dispersants, surfactants, anti-foaming agents, and the like. The treating formulation most preferably has a pH ranging from about 1.5 to 4.0.

The Preferred Operation

The preferred operation of the invention includes a method for cleaning corroded ferrometal systems which comprises:

1. Adding to said system in sufficient volume to contact all ferrometal surfaces, a treating formulation having a pH of from 1.0 to 5.0 and comprising:

| Ingredient | Amount |
| --- | --- |
| Water Soluble Iron Complexing Agent | 1.0–20.0 wt. % |
| Ferric Ion Reducing Agent | 0–5.0 wt. % |
| Copper Corrosion Inhibitor | 0–0.1 wt. % |

-continued

| Ingredient | Amount |
| --- | --- |
| Acid Corrosion Inhibitor | 0–0.2 wt. % |
| Water | Remainder | and then,

2. Circulating said treating formulation at operating temperatures ranging from about 20° C.14 90° C., preferably from 20°–65° C., and most preferably from 20°–50° C., through said ferrometal system while monitoring and maintaining pH within the range of 1.0 to 5.0, thereby forming a system formulation within the ferrometal system being treated, and then, 3. Monitoring said system formulation for total soluble iron content, and when said iron content reaches a level of at least 500 ppm, continuously or intermittently, removing at least a portion of said system formulation and contacting same with a metal ionic exchange resin, said resin having a greater affinity for ferrous ion, ferric ion, or mixtures thereof than does the iron complexing agent in the treating formulation, thereby forming both
   (a) an iron-resin adduct, and
   (b) a recovered treating formulation having at least about 90% of each ingredient originally present in the treating formulation;

and then,

4. Recycling said recovered treating formulation back to the ferrometal system and continuing cleaning steps 2 through 4 inclusive, and then, 5. When iron is detected in the recovered treating formulation exiting the resin contact, preferably at at least 10% of the influent iron concentrations, removing said exchange resin, now known as a spent exchange resin, from contact with the system formulation and contacting said spent resin with a strong inorganic acid, thereby forming a regenerated metal ionic exchange resin and a concentrated waste stream, and then, 6. Placing said regenerated exchange resin back into contact with the system formulation as in step 3 above, and subsequent steps.

and then,

7. Discarding or further treating for disposal the concentration iron waste stream.

The preferred treating formulation comprises preferably:

| Ingredient | Amount |
| --- | --- |
| Tannin, citric acid, or mixtures thereof | 1–20 weight % |
| Erythorbic Acid | 0.1–4.0 weight % |
| Tolyltriazole | 25–1500 parts per million |
| Diethylthiourea, Pyridinium salts or mixtures thereof | 25–1500 parts per million |
| Water | Remainder |
| pH | 1.5 to 5.0 | and further, the metal ionic exchange resin is preferably chosen from cross-linked styrene-divinyl benzene sulfonate resin, cross-linked styrene divinyl benzene iminodiacetic acid resins, or mixtures thereof. The resin is preferably contained in at least one columnar bed and is regenerated, as needed, by the addition of concentrated hydrochloric acid.

The method of cleaning corroded ferrometal products from ferrometal systems may be practiced as described until at least 200 grams, preferably from 200–500 grams, of iron per square foot of ferrometal in contact with said system formulation has been removed by the metal ionic exchange resin from the ferrometal system.

In the above preferred practice, the treating formulation most preferred comprises:

| Ingredient | Amount |
| --- | --- |
| Citric Acid | 2.5–20 weight % |
| Erythorbic Acid | 0.5–4.0 weight % |
| Tolyltriazole | 100–500 ppm |
| Diethylthiourea | 100–1000 ppm |
| Water | Remainder | said treating formulation having a pH of from 1.5 to 5.0 and further, wherein the metallic exchange resin is a resin chosen from the group consisting of cross-linked styrene, divinyl benzene resins containing pendant sulfonate functionality, cross-linked styrene divinyl benzene resins containing iminodiacetic acids functionality, or mixtures thereof.

When the methods above are practiced, the best mode of practicing the invention is to add a treating formulation comprising:

| Ingredient | Amount |
| --- | --- |
| Citric Acid | 5.0–10.0 wt. % |
| Erythorbic Acid | 0.5–4.0 wt. % |
| Tolyltriazole | 100–500 ppm |
| Diethylthiourea | 500–1000 ppm |
| Water | Remainder |
| pH | 1.5–4.0 |

The best mode of practicing the invention includes the choice of resins such that the resin is a cross-linked styrene divinyl benzene copolymer having pendant functional groups chosen from the sulfonic acid group, the iminodiacetic acid groups, or mixtures thereof, and said resin is contacted with the system formulation so as to provide for a recovered treating solution, which is recycled to said system formulation such that the rates of recycle and the rates of resin bed feed from the system formulation provide for the maintenance, during treatment, of total iron, in the system formulation ranging between about 500 parts per million to about 2,000 parts per million, or higher. This range of iron concentration, as total iron including the sum of soluble ferrous ion, soluble ferrous citrate complex, soluble ferric ion, and soluble ferric citrate complex, is controlled by adjusting resin bed feed and resin bed effluent return to the system and such that the total iron ranges from 500 to 1,000 ppm and up to about 2,000 ppm, or higher.

As described above, the ratios of citrate to erythorbic acid can be controlled on-site, if desired, so as to control the ferrous ion to ferric ion ratios in the total iron concentrations in the system formulation. Therefore, of the 500 to 2,000 parts per million total iron concentration in the system formulation, the ferrous ion to ferric ion concentration is controlled so as to range between about 5:1 to about 1:1. Our invention is further exemplified by the following examples:

Iron Analysis

The analysis of ferrous and ferric ion involved the addition of one milliliter of sulfuric acid to a 25 ml. volumetric flask containing the sample to be analyzed, followed by the addition of approximately 2 milliliters each of ammonium fluoride, phenanthroline, and hexamethylenetetramine to the same flask. The flask may contain, for example, an aliquot solution of the system formulation, the treatment formulation, or the recovered treating formulation as above described. After stirring and waiting for approximately 15 minutes for color development, absorbance reading are taken at 510 nanometers with any appropriate spectrophotometer and correlated to standard solutions of known concentrations of ferrous ions. The container in which the solution are added and the reactions are contained should be protected from oxygen during the test procedure.

For measurement of total iron, the same procedure is followed with the exception that 2 milliliters of erythorbic acid, instead of ammonium fluoride are added to the container. The analysis is done and the ferric ion concentration is obtained by difference.

The simplified procedure involves the addition of approximately 2 milliliters of citrate buffer, approximately 0.5 Molar in citric acid and having a pH of about 2.75, followed by the addition of approximately 2 milliliters of phenanthroline, followed by color development and photometric reading for ferrous ion analysis. In this simplified method, total iron measurements are made by substituting 2 milliliters of erythorbic acid prior to the addition of the citrate buffer, which buffer acts also as an masking agent for ferric ion.

Reduction of Ferric Citrate

The reduction of ferric citrate with erythorbic acid has been investigated as a function of pH. A ferric citrate solution containing 400 parts per million ferric citrate was mixed with 1600 parts per million erythorbic acid at the citrate pH of 2.75. After 30 minutes, the sample was analyzed for both ferrous iron and ferric iron. It was found that the amount of ferric iron reduced did not vary appreciably with pH and that the reduction was essentially quantitative.

Removal of Ferric/Ferrous Citrate with Ion-Exchange Resins

Experiments were conducted to study the removal of ferric and ferrous citrates with chelating and strong acid cation exchange resins. IRC-718 (from Rohm and Haas) and HGR (from Dow), respectively were used.

In this study, 10 milliliters of ferric citrate solution, before and after reduction with erythorbic acid, containing 400 parts per million ferric ion was mixed with 5 milliliters of each of the resins, and stirred. Stirring was stopped after approximately 1.5 hours, the resin beads allowed to settle down to the bottom of the container and samples of the supernatant were taken for analysis for ferrous/ferric ion. The results are shown in Table 1:

TABLE 1

Percent of Iron (II and III) retained by the resins in sodium form vs. pH before and after reduction with erythorbic acid; Total iron level = 340 ppm

| Solution pH | composition | resin | % iron removed | citrate, ppm | Final pH |
| --- | --- | --- | --- | --- | --- |
| 1 | 90% Fe(III), 10% Fe(II) | HGR | 100 | 1000 | 2.2 |

TABLE 1-continued

Percent of Iron (II and III) retained by the resins in sodium form vs. pH before and after reduction with erythorbic acid; Total iron level = 340 ppm

| Solution pH | composition | resin | % iron removed | citrate, ppm | Final pH |
|---|---|---|---|---|---|
| 1 | 90% Fe(III), 10% Fe(II) | IRC-718 | 82 | 910 | 5.0 |
| 2 | 90% Fe(III), 10% Fe(II) | HGR | 29 | 1100 | 3.4 |
| 2 | 90% Fe(III), 10% Fe(II) | IRC-718 | 78 | 920 | 8.5 |
| 3 | 90% Fe(III), 10% Fe(II) | HGR | 18 | 1000 | 4.1 |
| 3 | 90% Fe(III), 10% Fe(II) | IRC-718 | 82 | — | 9.1 |
| 4 | 90% Fe(III), 10% Fe(II) | HGR | 21 | 1000 | 4.8 |
| 4 | 90% Fe(III), 10% Fe(II) | IRC-718 | 88 | 970 | 9.3 |
| 5 | 90% Fe(III), 10% Fe(II) | HGR | 14 | 1100 | 6.3 |
| 5 | 90% Fe(III), 10% Fe(II) | IRC-718 | 87 | 800 | 9.4 |
| 3 | 70% Fe(II), 30% Fe(III) | HGR | 43 | 1100 | 4.12 |
| 3 | 70% Fe(II), 30% Fe(III) | IRC-718 | 86 | 890 | 8.85 |

The results indicate that the ferric citrate and ferrous citrate complexes can be treated to remove therefrom both ferrous and ferric ions forming either ferrous or ferric ion resin complexes and releasing citric acid to the resin effluent. It is seen that the chelating resin consistently removes ferric and ferrous ions with high degree of efficiency, whereas the HGR is effective at low pH values. This indicates that Dow HGR can be effective in the $H^+$ form. The consistently lower value for citrate in the supernatant in the IRC-718 case can be attributed to the dilution effect caused by the higher moisture content of the resin.

Experiments were also run in a more realistic mode, wherein the resin was contained in a column. Solution of ferric and ferrous citrates, containing approximately 400 ppm of ferric/ferrous ions at a pH of 2.8 were pumped through the column and the column effluent was measured for the ferric/ferrous ions as well as citrate levels. The results for Dow HGR and IRC-718 (both in the $Na^+$ form) are shown in FIGS. 1(a) and (b). Each sample number corresponds to one bed volume of resin. It can be seen that both the resins remove ferrous ions from ferrous citrate solutions quantitatively. IRC-718 removes ferric ions quantitatively, but the HGR is not so effective. In either case, citrate is not removed, allowing for its recycle back to the cleaning formulation.

Figure 4:
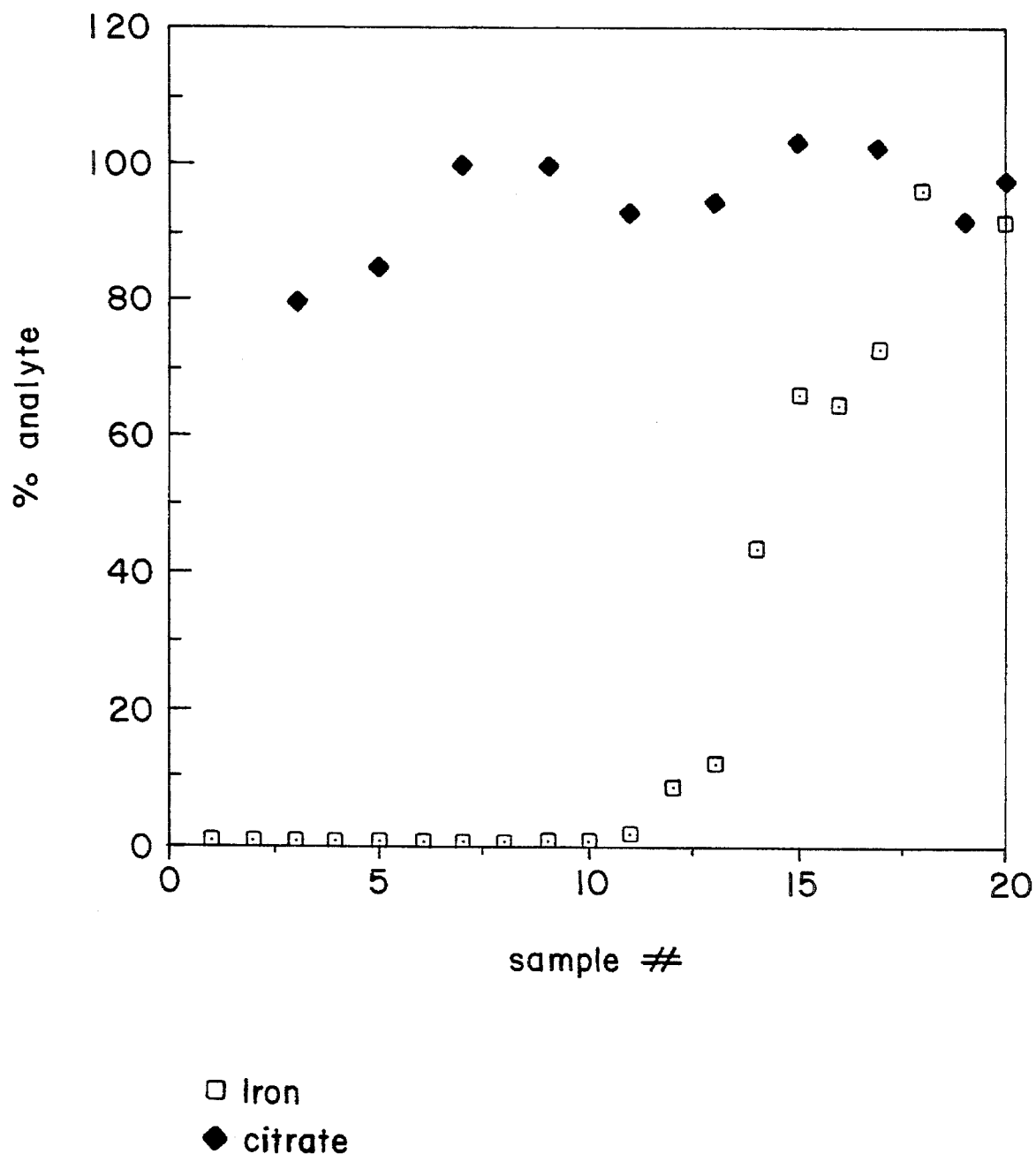
FIG. 4 presents the titration curves for a commercially available strong acid ion exchange resin

Another experiment was also conducted in which a 5,000 ppm ferric citrate solution (as iron), along with 15,000 ppm citrate was pumped through a column containing HGR in the $H^+$ form. The effluent was once again analyzed for ferric ions and citrate. The results are shown in FIG. 4. It can be seen that HGR is very effective in removing ferric ions while not removing the citrate ions.

In summary, it is preferred to use a Strong acid cation exchange resin in the $H^+$ form. The IRC-718 seems to work effectively in either form. Both ferrous and ferric ions are retained by either of the resins. However, citrate is not retained. Therefore, citric acid or salts thereof, elutes from the resin bed and may be used again in the ferrometal system, accruing great savings in citrate chemical cost. The same is true of the erythorbic acid which has not been used in the reduction of ferric to ferrous ions.

The important observation made from these experiments is that the resins in all cases removed from the ferrous and/or ferric citrate complexes both ferrous and ferric ions and permitted all of the citrate to be eluted from the resin columns for recycle and reuse.

Ferrous Citrate Precipitation

Ferrous citrate precipitation has been observed in iron cleaning. Normally this ferrous citrate does not precipitate until the concentration of ferrous citrate exceeds about 9,000 parts per million, as ferrous citrate, in the system solutions. As a result, although it is preferred to reduce the ferric ion content, either as soluble ferric ion or as soluble ferric citrate complex, to reduce the tendency of these ferric ion species to cause corrosion of ferrometal surfaces, it is also a preferred operating parameter to retain ferrous citrate concentrations below the precipitating concentrations for ferrous citrate, or about 9,000 part per million. Because operating conditions can vary in terms of pH, temperature, and concentrations of other species, it is most preferred to operate such that the total iron concentration in the system formulation ranges from 500 to about 2,000 parts per million and that the ferrous ion portion of the total concentration ranges from about 80% to about 50%, or that the ratio of ferrous ion to ferric ion in the total iron analysis ranges from about 5:1 to 1:1. These metastable phenomena can be seen in FIG. 4, which shows the instantaneous precipitation of ferrous citrate at various pH's and concentrations of iron.

Finally, because the system formulation can pick up some dispersible materials, which materials may not be soluble in the system formulation liquid, it may obviously be advantageous to filter the system formulation prior to addition to the resin beds. This filtration may be accomplished by any of the normal filtration techniques useful in the art. Such filtration techniques can include plate and frame filters, simple in-line filters, and the like. The recovered dispersed materials from the filter may then be added to the concentrated waste solutions obtained from regeneration of the resin beds and the admixture disposed or treated for further disposal purposes.

Having described our invention we claim:

1. A method for cleaning a corroded ferrometal system which comprises:

1) adding to said system in sufficient volume to contact all ferrometal surfaces in said system a treating formulation having a pH of from 1.0 to 5.0 and comprising:

| ingredient | amount |
|---|---|
| water soluble iron complexing agent | 1.0–20.0 wt. % |
| ferric iron reducing agent | 0–5.0 wt. % |
| copper corrosion inhibitor | 0–0.1 wt. % |
| acid corrosion inhibitor | 0–0.2 wt. % |
| water | remainder | and then, 2) circulating said treating formulation at temperatures ranging from 20° C.–90° C. through said system while monitoring and maintaining pH within the range of 1.0 to 5.0; thereby forming a system formulation and then, 3) monitoring said system formulation for total soluble iron content, and when said iron content reaches a level of at least 1,000 ppm, continuously or intermittently removing at least a portion of said system formulation and contacting same with a metal ionic exchange resin, said resin having an equal or greater affinity for ferrous ion, ferric ion, or mixtures thereof than does the iron complexing agent of the treating formulation, thereby forming both (a) an iron-resin adduct, and (b) a recovered wearing formulation having at least about 90 % of each ingredient originally present in the treating formulation;

and then, 4) recycling said recovered treating formulation back to the ferrometal system and continuing cleaning steps 2 through 4 inclusive, and then, 5) when iron is detected at levels of at least 10% of the system formulation iron content in the recovered treating formulation, removing said resin from contact with the system formulation and contacting said resin with a strong inorganic acid, thereby forming a regenerated metal ionic exchange resin and a concentrated iron waste stream, and then, 6) placing said regenerated exchange resin back into contact with said system formulation, as in step 3 above, and 7) discarding the concentrated iron waste stream.

2. The method of claim 1 wherein the treating formulation comprises:

| ingredient | amount |
| --- | --- |
| tannin, citric acid, or mixtures thereof | 1–20 weight % |
| erythorbic acid | 0.1–4.0 weight % |
| tolyltriazole | 25–1500 parts per million |
| diethylthiourea, pyridinium salts or mixtures thereof | 25–1500 parts per million |
| water | remainder |
| pH | 1.5 to 5.0 | and further, wherein the metal ionic exchange resin is chosen from cross-linked styrene divinyl benzene sulfonate resin, cross-linked styrene divinyl benzene iminodiacetic acid resins, or mixtures thereof, and further wherein the resin is contained in at least one columnar bed, and is regenerated by the addition of concentrated hydrochloric acid, and further, wherein the method is practiced until at least 200 grams of iron per square foot of ferrometal in contact with said system formulation has been removed from the resin.

3. The method of claim 2 wherein the treating formulation comprises:

| ingredient | amount |
| --- | --- |
| citric acid | 2.5–20 weight % |
| erythorbic acid | 0.5–4.0 weight % |
| tolyltriazole | 100–500 ppm |
| diethylthiourea | 100–1000 ppm |
| water | remainder | said treating formulation having a pH of from 1.5–5.0 and further, wherein the metallic exchange resin is a resin selected from the group consisting of either cross-linked styrene divinyl benzene sulfonates, and cross-linked styrene divinyl benzene iminodiacetic acids.

4. The method of claims 1, 2, or 3 wherein the system formulation is circulated through the ferrometal system at a temperature of between about 20° C. and about 65° C., and prior to contacting the system formulation with the metal exchange resin, it is filtered.

5. The method of claim 1 wherein the treating formulation comprises:

| ingredient | amount |
| --- | --- |
| citric acid | 5.0–10.0 wt. % |
| erythorbic acid | 0.5–4.0 wt. % |
| tolyltriazole | 100–500 ppm |
| diethylthiourea | 500–1000 ppm |
| water | remainder; |
| the pH ranges between about 1.5–4.0 | | and further wherein the resin is a cross-linked styrene divinyl benzene copolymer having pendant functional groups chosen from at least one of the sulfonic acid and iminodiacetic acid groups, said resin being contacted with system formulation, and said recovered treating solution being recycled to said system formulation such that the rates of recycle and of resin bed feed provide for the maintenance of total soluble iron in the system formulation ranging between about 500 ppm to about 2,000 ppm.

6. The method of claim 5, wherein the ratio of ferrous ion to ferric ion in the system formulation is between about 5:1 to about 1:1.

7. The method of claim 5 or 6 wherein, prior to contacting the system formulation with the resin, the system formulation is filtered.

8. The method of claims 1, 2, 3, 5, or 6 wherein the ferrometal system being treated is selected from the group consisting of open recirculating cooling water systems, closed recirculating cooling water systems, nuclear plant cooling water systems, and individual heat exchangers contained therein.

* * * * *

UNITED STATES PATENT AND TRADEMARK OFFICE
CERTIFICATE OF CORRECTION

PATENT NO.    : 5,466,297
DATED         : NOVEMBER 14, 1995
INVENTOR(S)   : WALTER H. GOODMAN, ET AL

It is certified that error appears in the above-indentified patent and that said Letters Patent is hereby corrected as shown below:

CLAIM 1, COLUMN 13, LINE 10 a recovered wearing formulation having at least

Should Read    :

a recovered _treating_ formulation having at least

Signed and Sealed this

Twentieth Day of February, 1996

Attest:

BRUCE LEHMAN

*Attesting Officer*

*Commissioner of Patents and Trademarks*